United States Patent
Levi et al.

(10) Patent No.: US 10,419,329 B2
(45) Date of Patent: Sep. 17, 2019

(54) SWITCH-BASED RELIABLE MULTICAST SERVICE

(71) Applicant: Mellanox Technologies TLV Ltd., Raanana (IL)

(72) Inventors: Lion Levi, Yavne (IL); George Elias, Tel Aviv (IL); Oded Wertheim, Tel Aviv (IL); Amiad Marelli, Herzliya (IL); Miriam Menes, Tel Aviv (IL); Itamar Rabenstein, Petach Tikva (IL); Noam Avital, Tel Aviv (IL); Evyatar Romlet, Raanana (IL); Ofir Merdler, Tel Aviv (IL)

(73) Assignee: Mellanox Technologies TLV Ltd., Raanana (IL)

( * ) Notice: Subject to any disclaimer, the term of this patent is extended or adjusted under 35 U.S.C. 154(b) by 222 days.

(21) Appl. No.: 15/473,643

(22) Filed: Mar. 30, 2017

(65) Prior Publication Data
US 2018/0287928 A1  Oct. 4, 2018

(51) Int. Cl.
*H04L 12/761* (2013.01)
*H04L 1/16* (2006.01)

(52) U.S. Cl.
CPC ............ *H04L 45/16* (2013.01); *H04L 1/16* (2013.01)

(58) Field of Classification Search
CPC . H04L 45/16; H04L 1/16; H04L 12/18; H04L 49/201
See application file for complete search history.

(56) References Cited

U.S. PATENT DOCUMENTS

| | | | |
|---|---|---|---|
| 6,233,244 B1 | 5/2001 | Runaldue et al. |
| 6,349,340 B1 | 2/2002 | Dyer et al. |
| 6,542,502 B1 | 4/2003 | Herring et al. |
| 6,606,317 B1 | 8/2003 | Beadle et al. |
| 7,126,946 B2 | 10/2006 | Beadle et al. |
| 7,152,231 B1 | 12/2006 | Galluscio et al. |
| 7,769,028 B2 | 8/2010 | Boley et al. |
| 7,936,753 B1 | 5/2011 | Colloff et al. |
| 7,990,860 B2 | 8/2011 | Smith et al. |
| 8,050,263 B1 | 11/2011 | Walsh |
| 2002/0075871 A1 | 6/2002 | Blanc et al. |
| 2006/0114848 A1 | 6/2006 | Eberle et al. |

(Continued)

OTHER PUBLICATIONS

U.S. Appl. No. 14/961,923 Office Action dated Oct. 18, 2017.

*Primary Examiner* — Pao Sinkantarakorn
*Assistant Examiner* — Kabir U Jahangir
(74) *Attorney, Agent, or Firm* — Kligler & Associates (57) ABSTRACT

Communication apparatus includes a plurality of interfaces for receiving and transmitting data packets from and to a network and a memory, which receives and stores context data with respect to multicast groups. Packet processing circuitry establishes reliable connections over the network with the receiving nodes in the multicast groups, and upon receiving from a packet source on the network an incoming unicast packet containing multicast data and containing multicast metadata that identifies a multicast group, sends an acknowledgment of the incoming unicast packet to the packet source, reads the context data from the memory with respect to the identified multicast group, and transmits multiple outgoing unicast packets containing the multicast data via respective egress interfaces to the receiving nodes in the multicast group over the reliable connections.

18 Claims, 3 Drawing Sheets

(56) References Cited

U.S. PATENT DOCUMENTS

| | | |
|---|---|---|
| 2007/0189290 A1* | 8/2007 | Bauer ................. H04L 12/1836 |
| | | 370/390 |
| 2007/0291755 A1 | 12/2007 | Cheng et al. |
| 2009/0073978 A1 | 3/2009 | Craddock et al. |
| 2013/0250762 A1 | 9/2013 | Assarpour |
| 2015/0201312 A1* | 7/2015 | Tjahjono ................. H04W 4/08 |
| | | 370/312 |
| 2016/0337258 A1 | 11/2016 | Attar et al. |
| 2017/0063613 A1 | 3/2017 | Bloch et al. |
| 2017/0163567 A1 | 6/2017 | Roitshtein et al. |

* cited by examiner

SWITCH-BASED RELIABLE MULTICAST SERVICE

FIELD OF THE INVENTION

The present invention relates generally to packet communication networks, and particularly to methods and apparatus for forwarding of multicast packets in such networks.

BACKGROUND

In multicast communication, data packets are delivered over a packet network to a specified group of destination computers simultaneously. In network-assisted multicast, the packet source transmits only a single copy of the packet that is to be distributed, with a multicast destination address in the packet header. Switches in the network automatically create multiple copies of the packet and forward the copies only to network segments that contain members of the multicast group, or to the group members themselves. (The term "switch" in the context of the present description and in the claims refers to any network element having multiple network interfaces and logic for forwarding packets between the interfaces, including, without limitation, routers, bridges and gateways, for example.)

Multicast is most commonly used for streaming of digital media and other data to groups of subscribers. In such applications, reliable transmission is generally not required or is handled at the application level between the source and destination computers to the extent that it is needed. The term "reliable" is used here in its conventional sense to mean that recipients of the packets acknowledge receipt, and packets are automatically retransmitted when a positive acknowledgment is not received, so that the source computer is assured that once a packet is transmitted to the network, it will be delivered to the destination computer (in the case of unicast) or to all destination computers in the designated multicast group. Standard multicast protocols, such as Internet Protocol (IP) multicast, operate on this unreliable model.

In some applications, however, members of a communication group need to verify that all multicast packets will be delivered to all group members. For example, U.S. Patent Application Publication 2017/0063613, whose disclosure is incorporated herein by reference, describes an aggregation protocol, referred to as referred the "Scalable Hierarchical Aggregation Protocol" (SHArP), which enables a switch in a data network to mediate data exchanges among network elements. A processor organizes the network elements into a hierarchical tree having a root node network element, vertex node network elements, and child node network elements that include leaf node network elements. The leaf node network elements originate aggregation data and transmit the aggregation data to respective parent vertex node network elements. The vertex node network elements combine the aggregation data from at least a portion of the child node network elements, and transmit the combined aggregation data from the vertex node network elements to parent vertex node network elements. Multicast operations in this network can be advantageously performed using a reliable multicast service.

Network-based reliable multicast services that are known in the art, however, suffer from problems of latency, high bandwidth consumption, and poor scalability that have limited their practical usefulness. A number of attempts have been made to alleviate these problems.

For example, U.S. Patent Application Publication 2006/0114848 describes a method for reliable multicast in which multiple multicast acknowledgements can be merged into a single multicast acknowledgement, which is said to reduce traffic and reduce logic complexity. An intermediate node that receives multiple multicast acknowledgements merges the multiple acknowledgements into a single acknowledgement, and then supplies the single merged acknowledgment to the multicast source. Encoding of the single merged acknowledgement conveys to the source which of the multicast targets successfully received (or which failed to receive) the multicast information.

As another example, U.S. Pat. No. 7,936,753 describes a system for transmitting a multicast message with one or more packets. The system includes an adapter including an entry port to receive the multicast message from a source for transmission to a plurality of destinations; one or more egress ports of the adapter that transmit one or more packets of the multicast message to the plurality of destinations and receive acknowledgement for the one or more packets from the one or more destinations; and a message manager that monitors the delivery status for one or more packets to the plurality of destinations without using a plurality of dedicated individual connections between each of the plurality of destinations and the source.

SUMMARY

Embodiments of the present invention that are described hereinbelow provide improved methods for reliable multicast, as well as apparatus implementing such methods.

There is therefore provided, in accordance with an embodiment of the invention, communication apparatus, including a plurality of interfaces, which are configured to serve as ingress interfaces and egress interfaces for receiving and transmitting data packets from and to a network. A memory is configured to receive and store context data with respect to multicast groups, each multicast group including a set of receiving nodes on the network. Packet processing circuitry is configured to establish reliable connections over the network with the receiving nodes in the multicast groups, to receive from a packet source on the network, via an ingress interface, an incoming unicast packet containing multicast data and containing multicast metadata that identifies a multicast group, to send an acknowledgment of the incoming unicast packet to the packet source, to read the context data from the memory with respect to the identified multicast group, and to transmit, based on the context data, multiple outgoing unicast packets containing the multicast data via respective egress interfaces to the receiving nodes in the multicast group over the reliable connections.

In the disclosed embodiments, the packet processing circuitry is configured to receive, from the receiving nodes over the reliable connections, acknowledgments of receipt of the outgoing unicast packets, and to track the received acknowledgments in order to verify completion of distribution of the multicast data to the identified multicast group. Typically, the packet processing circuitry is configured to retransmit an outgoing unicast packet to a receiving node in the identified multicast group when a positive acknowledgment is not received from the receiving node within a predefined time limit.

Additionally or alternatively, the packet processing circuitry is configured to insert the multicast metadata in the outgoing unicast packets. In some embodiments, at least one of the receiving nodes in at least one of the multicast groups is a switch in the network, which receives one of the outgoing unicast packets transmitted by the apparatus and generates, in response to the multicast metadata in the one of the unicast packets, one or more further outgoing unicast packets containing the multicast data for transmission to one or more further receiving nodes. Typically, the packet processing circuitry is configured to receive, from the switch, an acknowledgment of receipt of the one of the outgoing unicast packets, and to track the received acknowledgment in order to verify completion of distribution of the multicast data to the identified multicast group.

In the disclosed embodiments, the packet source can be a host computer connected to the network or a switch in the network.

In some embodiments, the packet processing circuitry is configured to generate and transmit the multiple outgoing unicast packets concurrently via the respective egress interfaces.

In a disclosed embodiment, the packet processing circuitry is configured to receive from the packet source a multi-packet multicast message including an input sequence of incoming unicast packets including at least a first packet and a last packet, to identify the multicast group using the multicast metadata in the first packet in the input sequence, and to transmit multiple output sequences of the outgoing unicast packets via the respective egress interfaces to the receiving nodes, such that the first packet in the output sequences is transmitted before the last packet in the input sequence has been received through the ingress interface.

There is also provided, in accordance with an embodiment of the invention, a method for communication, which includes storing, in a switch having a plurality of interfaces serving as ingress interfaces and egress interfaces for receiving and transmitting data packets from and to a network, context data with respect to multicast groups, each multicast group including a set of receiving nodes on the network. Reliable connections are established over the network with the receiving nodes in the multicast groups. Upon receiving from a packet source on the network, via an ingress interface, an incoming unicast packet containing multicast data and containing multicast metadata that identifies a multicast group, an acknowledgment of the received incoming unicast packet is sent to the packet source. Based on the stored context data with respect to the identified multicast group, multiple outgoing unicast packets containing the multicast data are transmitted via respective egress interfaces of the switch to the receiving nodes in the multicast group over the reliable connections.

The present invention will be more fully understood from the following detailed description of the embodiments thereof, taken together with the drawings in which:

DETAILED DESCRIPTION OF EMBODIMENTS

Embodiments of the present invention that are described herein provide an efficient mechanism for reliable multicast over a packet network, using dedicated acceleration hardware in the network switches. The acceleration is transparent to the host computers that receive the multicast packets, and can thus be implemented in existing networks without modifications to host hardware (such as network interface controllers) and standard protocols.

Upon receiving an incoming packet that is designated for multicast transmission, the switch hardware makes multiple copies of the packet and transmits them via the appropriate egress interfaces of the switch to the members of the multicast group. The switch transmits the copies as unicast packets, using a standard reliable unicast transport protocol, with the appropriate, standard unicast header for each recipient. The recipients acknowledge receipt to the switch as required by the unicast protocol, and need not be aware at all that they have received a multicast. The switch tracks the acknowledgments in order to verify that all copies have been received and to retransmit packets when required.

The disclosed embodiments are implemented in apparatus such as a switch (broadly defined, as noted above), having a plurality of interfaces, such as switch ports, for receiving and transmitting data packets from and to a network. The switch comprises a memory, which receives and stores context data with respect to multicast groups, each of which comprises a set of receiving nodes on the network. In a given multicast group, these receiving nodes may include both host computers and other switches, which hold their own context data for this multicast group. The multicast group may thus be built over a hierarchy of switches for delivery from a source host to widely-distributed destination endpoints.

Packet processing circuitry in the switch establishes reliable connections over the network with the receiving nodes in the multicast groups that it serves. It can be advantageous to establish these connections in advance, in order to avoid subsequent delays in distribution of data packets, but the reliable connections may alternatively be established ad hoc when required for packet distribution. Any suitable reliable unicast transport protocol may be used for this purpose, such as the Transmission Control Protocol (TCP) in IP networks or an InfiniBand™ reliable transport service.

The multicast acceleration process is triggered when the switch receives, via an ingress interface, an incoming unicast packet containing metadata indicating that the packet is designated for a given multicast group, along with multicast data for distribution to the group that is identified by the metadata. The source of the packet may be a host computer, or it may be another switch in the network. The switch typically receives the incoming unicast packet over a reliable connection, and thus sends an acknowledgment of the unicast packet to the packet source. Packet processing circuitry in the switch reads context data from the memory with respect to the multicast group that is indicated by the multicast metadata. Based on the context data, the packet processing circuitry transmits outgoing unicast packets containing the multicast data via appropriate egress interfaces to the receiving nodes in the multicast group over the reliable connections that it has established.

As noted earlier, the packet processing circuitry typically includes dedicated hardware logic, referred to herein as a "sender," for handling the reliable multicast functions provided by embodiments of the present invention. When the switch receives an incoming unicast packet with multicast metadata, the sender creates a corresponding work element comprising multicast control information and the multicast payload. Based on this work element, the sender instructs the switching logic in the switch to pass the multicast payload in parallel to all of the egress interfaces that are designated by the context data for this multicast group, along with corresponding control information. Each egress interface updates the packet header using the control information and then transmits the packet over a reliable unicast connection to its designated recipient. The outgoing packets may also contain the multicast metadata, thus enabling the "sender" in recipient switches to repeat the distribution process.

As noted earlier, recipients of the unicast packets return acknowledgments (ACK) upon receiving the packets (or possibly negative acknowledgments—NACK—if the received packets contain errors or arrives out of order, or if the receiver is unable to accept the packet, due to lack of buffer space, for example). Based on these ACK and NACK packets, the switching logic in the switch is able to verify and notify the sender of completion of the corresponding work elements, as well as automatically retransmitting the outgoing unicast packets when positive acknowledgments are not received within a predefined time limit. The initiator of the reliable multicast transmission is thus assured that once the initial unicast packet with the multicast data and metadata has been transmitted to and acknowledged by a switch in the network, the multicast will be delivered, reliably and transparently, to all of the host computers in the multicast group.

Figure 1:
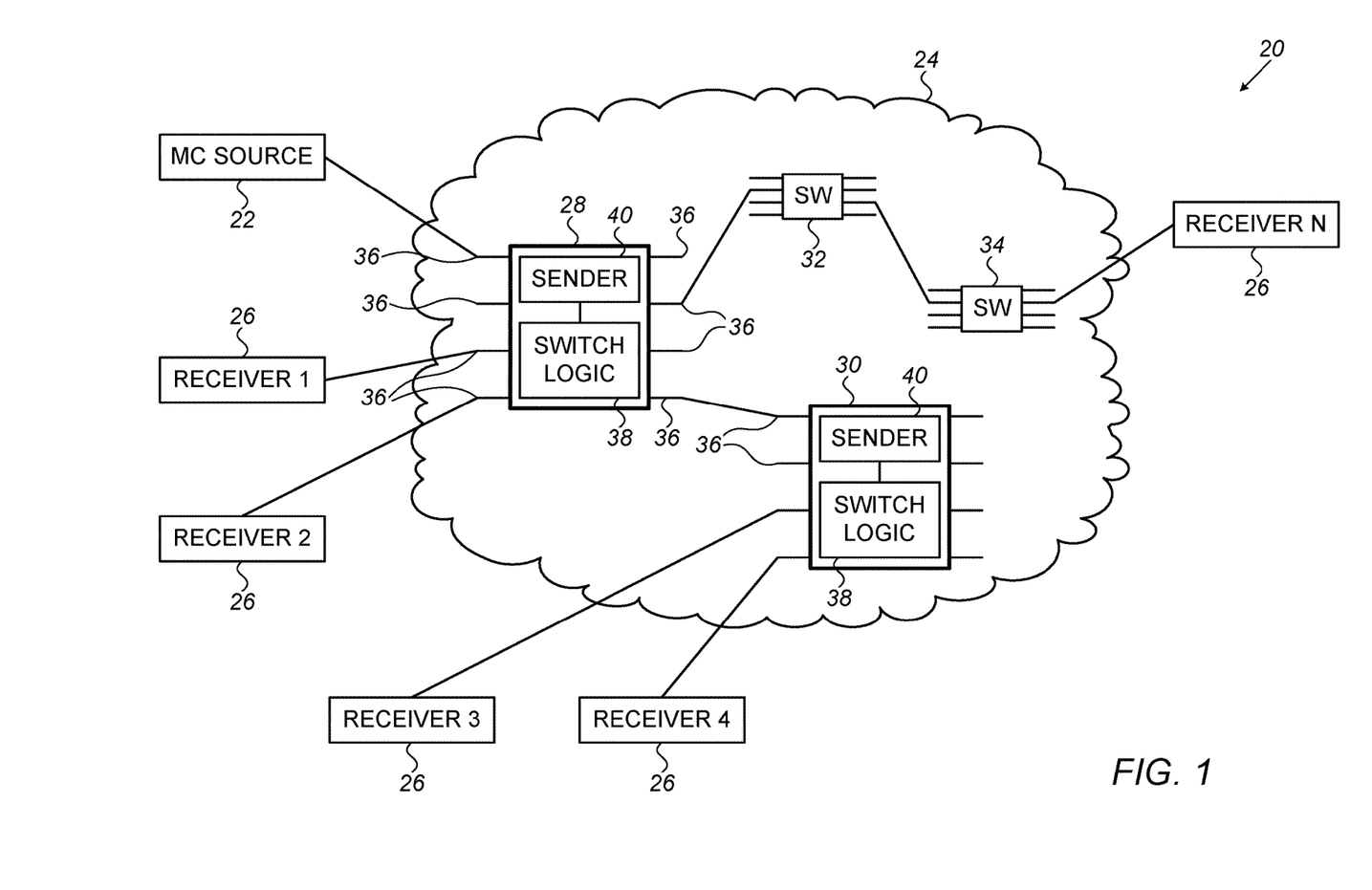
FIG. 1 is block diagram that schematically illustrates a computer network system supporting reliable multicast transmission, in accordance with an embodiment of the invention.

FIG. 1 is block diagram that schematically illustrates a computer network system 20 supporting reliable multicast transmission, in accordance with an embodiment of the invention. In system 20, multiple host computers are connected to a packet data network 24, typically via respective network interface controllers (NICs, not shown). In the present example, for the sake of simplicity, one of the host computers is marked as a multicast (MC) source 22, while the other host computers are receivers 26. In general, however, system 20 supports multiple different MC sources, which transmit to different, respective multicast groups; and a given host may be either a source or a receiver in various multicast groups.

Network 24 may comprise any suitable type of packet network, such as an Ethernet, IP, or InfiniBand (IB) network. Switches 28, 30, 32, 34, . . . , with protocol capabilities appropriate for the type of network 24, forward unicast packets from MC source 22 to receivers 26, along with other network traffic. Typically, each switch comprises multiple ports 36, which serve as ingress and egress interfaces from and to respective links through network 24. Switching logic 38 forwards packets among ports 36, along with other packet processing functions, such as queuing incoming and outgoing packets and updating packet headers. A sender 40 in each switch 28, 30, 32, 34, . . . , handles distribution of multicast data by reliable unicast transmission, as explained herein.

Switching logic 38 and sender 40 are collectively referred to herein as packet processing circuitry. Although switching logic 38 and sender 40 are shown and referred to, for the sake of conceptual clarity, as separate functional units, in practice these functional elements of the packet processing circuitry may be implemented together in a single integrated circuit chip or, alternatively, distributed among two or more separate chips. Further additionally or alternatively, some of the packet processing functions of switching logic 38 may be performed by logic circuits associated with ports 36. The functions of switching logic 38 and sender 40 are typically implemented by dedicated hardware logic within switches 28, 30, 32, 34, . . . , which may be hard-wired or programmable. Additionally or alternatively, at least some of these functions may be carried out by an embedded microprocessor or microcontroller, which is programmed in software or firmware to perform the required tasks. All such implementations are considered to be within the scope of the present invention.

Multicast groups are typically established and exchange information over network 20 in accordance with a group communication protocol, such as the "Scalable Hierarchical Aggregation Protocol" (SHArP) described in the above-mentioned U.S. Patent Application Publication 2017/0063613. Any suitable protocol may be used for this purpose, however, and the details of group establishment and multicast traffic aggregation are beyond the scope of the present description. As illustrated in FIG. 1, although in some cases all members of a multicast group may be attached to different ports 36 of the same switch, the members of a multicast group may more generally be spread among the ports of different switches and even over different subnets, in a hierarchy of switches and ports. Thus, in the example shown in FIG. 1, receivers 1 and 2 are connected to ports of switch 28, while receivers 3 and 4 are connected to ports of switch 30, and receiver N is reached via switches 32 and 34.

Figure 2:
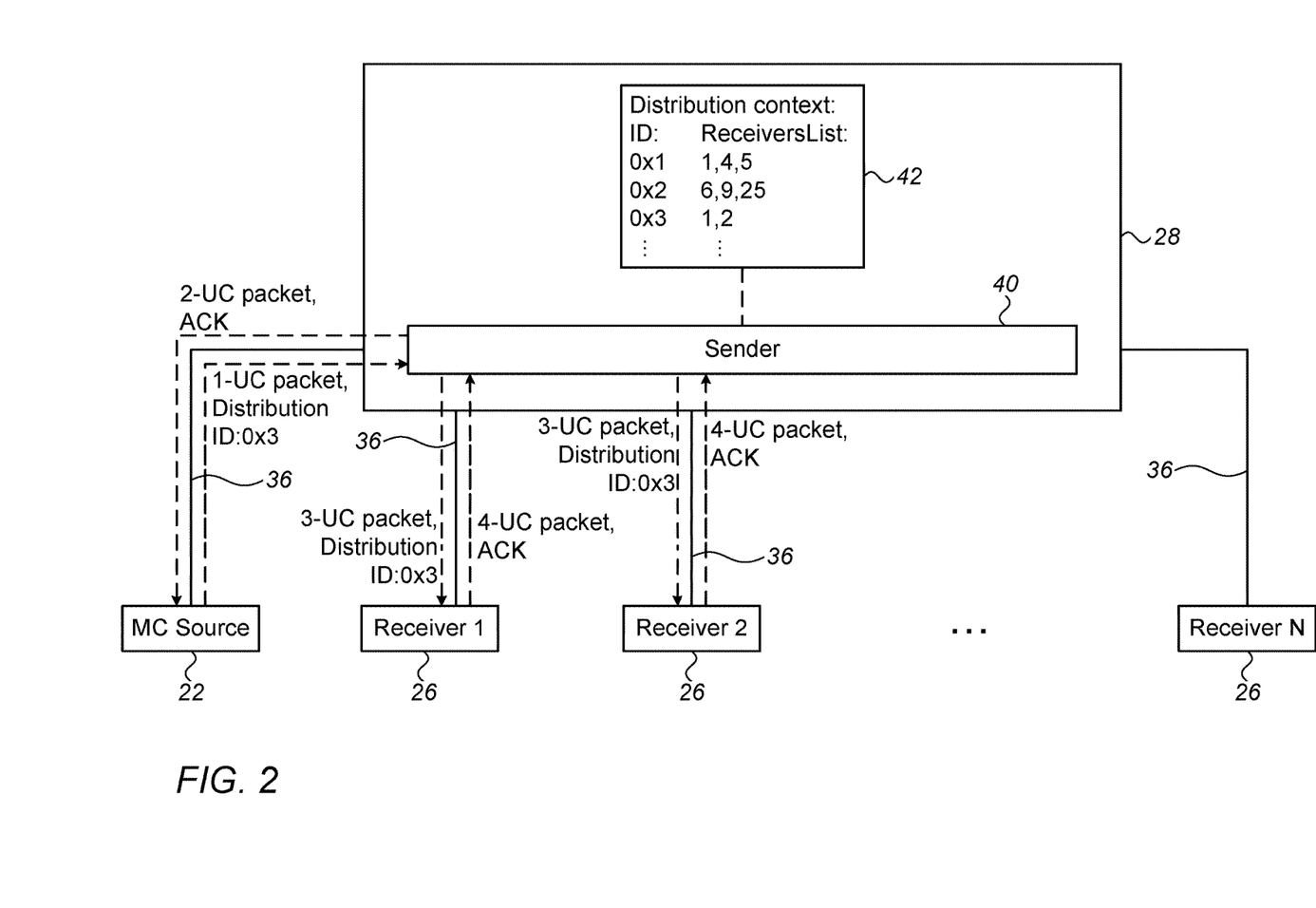
FIG. 2 is a block diagram that schematically illustrates a method for reliable multicast packet transmission, in accordance with an embodiment of the invention.

FIG. 2 is a block diagram that schematically illustrates a method for reliable multicast packet transmission, in accordance with an embodiment of the invention. The method is illustrated, for the sake of simplicity, with MC source 22 and receivers 26 all connected to the same switch 28. More generally, however, as explained above, sender 40 in switch 28 may distribute unicast packets containing multicast data and metadata to senders 40 in other switches. These other senders receive and acknowledge the packets in the same manner as is shown with respect to receivers 26 in FIG. 2, and then act as MC sources themselves in forwarding copies of the packets.

For purposes of handling multicast distribution, switch 28 comprises a memory 42, which receives and stores context data with respect to multicast groups. Each multicast group has its own identifier (ID) and comprises a set of receiving nodes on network 24. The present example relates to group ID:0x3, comprising receivers 1 and 2. The multicast group context data may be generated and distributed, for example, by operation of the above-mentioned SHArP.

The process of distributing a multicast packet is initiated (step 1) when MC source 22 sends a unicast packet to switch 28 over a reliable connection through network 24. The packet contains data for delivery to the multicast group and multicast metadata identifying the group as 0x3. Switch 28 acknowledges receipt of the packet to MC source 22 (step 2) and passes the packet to sender 40.

Sender 40 looks up the multicast ID in memory 42 and finds that the receiving nodes in the identified group are receiver 1 and receiver 2. On this basis, sender 40 sends unicast packets over respective reliable connections to the two recipients (step 3) via respective ports 36. (Although steps 2 and 3 are shown as occurring serially, in practice these steps can be carried out in parallel.) Each unicast packet again contains the multicast data and metadata identifying the multicast group. Upon receiving the packets intact, the recipients return acknowledgment packets (step 4), as required by the applicable reliable transport protocol. If either or both of the recipients were switches, the senders in these switches would repeat the above process of unicast transmission and acknowledgment, whereby the multicast data are distributed throughout the group hierarchy.

Figure 3:
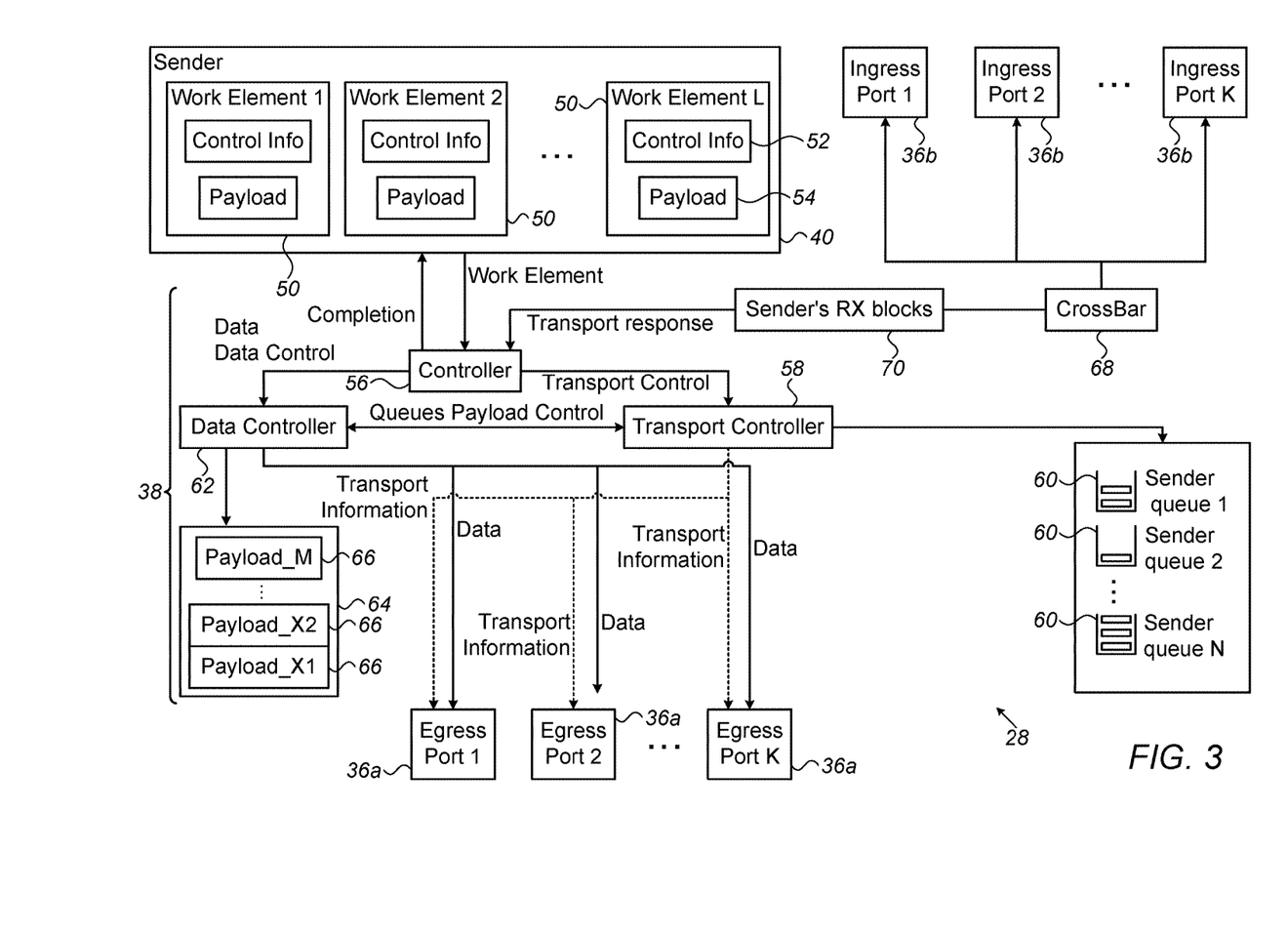
FIG. 3 is a block diagram that schematically illustrates an implementation of reliable multicast in a switch, in accordance with an embodiment of the invention.

FIG. 3 is a block diagram that schematically illustrates an implementation of reliable multicast in switch 28, in accordance with an embodiment of the invention. In this diagram, for the sake of conceptual clarity, unicast packets are shown to be transmitted via egress ports 36a, while the corresponding acknowledgments are received through ingress ports 36b. In general, however, egress and ingress are simply different logical components of the same (bidirectional) ports 36 that were described above. The functions connected with generating and tracking acknowledgment of the unicast packets are, in this embodiment, carried out by components of switching logic 38. Other functions of the switching logic are omitted for the sake of simplicity and will be apparent to those skilled in the art.

In response to incoming unicast packets that contain multicast metadata, sender 40 generates work elements 50, which control the generation of the corresponding outgoing unicast packets. Each work element 50 comprises control information 52, which is constructed by sender 40 on the basis of the multicast context data in memory 42 (FIG. 2) and indicates the addresses of the intended recipients, as well as other transport and optimization information. Work elements 50 also contain or point to respective multicast payload data 54, which will be distributed to the recipients.

To initiate transmission of the unicast packets to a given multicast group, sender 40 passes work element 50 to a main switch controller 56, which passes corresponding transport control instructions to a transport controller 58 and passes the multicast data (and possibly other data control instructions) to a data controller 62. In response to the instructions, transport controller 58 places packet descriptors in queues 60 for execution. Typically, each work element 50 will give rise to multiple outgoing unicast packets, with corresponding descriptors in the queues 60 belonging to the designated egress ports 36a. Concurrently, data controller 62 places multicast payloads 66 in a buffer 64; but in general only a single payload 66 is needed to create all of the outgoing packets resulting from a given work element 50.

When a descriptor reaches the head of the respective queue 60, transport controller 58 sends the corresponding transport information to the appropriate egress port 36a and prompts data controller 62 to pass the appropriate payload 66 (or a pointer to the payload) to the egress port. Each egress port 36a creates the appropriate packet header for reliable unicast transmission to the recipient, adds the payload, computes error detection codes as dictated by the applicable network protocols, and transmits the packet to its corresponding receiver 26. To enhance efficiency and throughput, main switch controller 56 provides optimization information to transport controller 58 and data controller 62 to enable them to coordinate management of queues 60 so that each payload 66 is passed concurrently to all the egress ports serving recipients in the multicast group in question (or at least to a subset of the egress ports). Thus, the unicast packets are generated and transmitted concurrently to the recipients in each multicast group through the corresponding egress ports.

In some embodiments, switching logic 38 is optimized for handling multi-packet messages. For example, the InfiniBand reliable connected (RC) transport service enables MC source 22 to send large multicast messages, in which the overall data payload is divided among a sequence of packets, including a "first" packet, followed by "middle" packets, and finally a "last" packet. In the present embodiment, the multicast metadata are carried in the first packet of the message. Switching logic 38 reads the metadata from the first packet, in the manner explained above, and then proceeds to use the same metadata in generating and forwarding all of the other packets in this message. Switching logic 38 does not wait to receive the entire message before forwarding the unicast packets to the recipients in the multicast group, but rather handles and forwards each of the incoming packets upon arrival using the metadata from the first packet. Thus, in other words, switching logic 38 transmits the first packet in the output sequences of unicast packets to receivers 26 before the last packet in the input sequence (and possibly at least some of the middle packets, as well) has been received through the ingress interface of switch 28. This approach reduces the completion latency of the multicast process for large messages.

Upon receiving the packets, receivers 26 return ACK packets 70 (or NACK if the received packet was corrupted) to corresponding ingress ports 36B. Crossbar switching logic 68 passes the ACK packets over the regular receive path of switch 28 to controller 56. Upon receiving an ACK or NACK, controller 56 updates transport controller 58, which accordingly retires the corresponding descriptor or retransmits the outgoing packet if necessary. When all of the descriptors belonging to a given work element 50 have been executed successfully, controller 56 signals sender 40 to indicate that the work element has been completed. At this point, the work element can be deleted, and the corresponding control information and payload buffers can be cleared, since sender 40 has received verification that all recipients in the multicast group have successfully received their corresponding unicast packets. This process is repeated in all of the switches of the multicast hierarchy.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A communication apparatus, comprising:
a plurality of interfaces, which are configured to serve as ingress interfaces and egress interfaces for receiving and transmitting data packets from and to a network;
a memory, which is configured to receive and store context data with respect to multicast groups, each multicast group comprising a set of receiving nodes on the network; and
packet processing circuitry, which is configured to establish reliable connections over the network with the receiving nodes in the multicast groups, to receive from a packet source on the network, via an ingress interface, an incoming unicast packet containing multicast data and containing multicast metadata that identifies a multicast group, to send an acknowledgment of the incoming unicast packet to the packet source, to read the context data from the memory with respect to the identified multicast group, and to transmit, based on the context data, multiple outgoing unicast packets containing the multicast data via respective egress interfaces to the receiving nodes in the multicast group over the reliable connections,
wherein the packet processing circuitry is configured to generate and transmit the multiple outgoing unicast packets concurrently via the respective egress interfaces.

2. The apparatus according to claim 1, wherein the packet processing circuitry is configured to receive, from the receiving nodes over the reliable connections, acknowledgments of receipt of the outgoing unicast packets, and to track the received acknowledgments in order to verify completion of distribution of the multicast data to the identified multicast group.

3. The apparatus according to claim 2, wherein the packet processing circuitry is configured to retransmit an outgoing unicast packet to a receiving node in the identified multicast group when a positive acknowledgment is not received from the receiving node within a predefined time limit.

4. The apparatus according to claim 1, wherein the packet processing circuitry is configured to insert the multicast metadata in the outgoing unicast packets.

5. The apparatus according to claim 1, wherein the packet source is a host computer connected to the network.

6. The apparatus according to claim 1, wherein the packet source is a switch in the network.

7. A communication apparatus, comprising:
a plurality of interfaces, which are configured to serve as ingress interfaces and egress interfaces for receiving and transmitting data packets from and to a network;
a memory, which is configured to receive and store context data with respect to multicast groups, each multicast group comprising a set of receiving nodes on the network; and
packet processing circuitry, which is configured to establish reliable connections over the network with the receiving nodes in the multicast groups, to receive from a packet source on the network, via an ingress interface, an incoming unicast packet containing multicast data and containing multicast metadata that identifies a multicast group, to send an acknowledgment of the incoming unicast packet to the packet source, to read the context data from the memory with respect to the identified multicast group, and to transmit, based on the context data, multiple outgoing unicast packets containing the multicast data via respective egress interfaces to the receiving nodes in the multicast group over the reliable connections,
wherein the packet processing circuitry is configured to insert the multicast metadata in the outgoing unicast packets, and
wherein at least one of the receiving nodes in at least one of the multicast groups is a switch in the network, which receives one of the outgoing unicast packets transmitted by the apparatus and generates, in response to the multicast metadata in the one of the unicast packets, one or more further outgoing unicast packets containing the multicast data for transmission to one or more further receiving nodes.

8. The apparatus according to claim 7, wherein the packet processing circuitry is configured to receive, from the switch, an acknowledgment of receipt of the one of the outgoing unicast packets, and to track the received acknowledgment in order to verify completion of distribution of the multicast data to the identified multicast group.

9. A communication apparatus, comprising:
a plurality of interfaces, which are configured to serve as ingress interfaces and egress interfaces for receiving and transmitting data packets from and to a network;
a memory, which is configured to receive and store context data with respect to multicast groups, each multicast group comprising a set of receiving nodes on the network; and
packet processing circuitry, which is configured to establish reliable connections over the network with the receiving nodes in the multicast groups, to receive from a packet source on the network, via an ingress interface, an incoming unicast packet containing multicast data and containing multicast metadata that identifies a multicast group, to send an acknowledgment of the incoming unicast packet to the packet source, to read the context data from the memory with respect to the identified multicast group, and to transmit, based on the context data, multiple outgoing unicast packets containing the multicast data via respective egress interfaces to the receiving nodes in the multicast group over the reliable connections,
wherein the packet processing circuitry is configured to receive from the packet source a multi-packet multicast message comprising an input sequence of incoming unicast packets including at least a first packet and a last packet, to identify the multicast group using the multicast metadata in the first packet in the input sequence, and to transmit multiple output sequences of the outgoing unicast packets via the respective egress interfaces to the receiving nodes, such that the first packet in the output sequences is transmitted before the last packet in the input sequence has been received through the ingress interface.

10. A method for communication, comprising:
storing, in a switch having a plurality of interfaces serving as ingress interfaces and egress interfaces for receiving and transmitting data packets from and to a network, context data with respect to multicast groups, each multicast group comprising a set of receiving nodes on the network;
establishing reliable connections over the network with the receiving nodes in the multicast groups;
receiving from a packet source on the network, via an ingress interface, an incoming unicast packet containing multicast data and containing multicast metadata that identifies a multicast group;
sending an acknowledgment of the received incoming unicast packet to the packet source; and
transmitting, based on the stored context data with respect to the identified multicast group, multiple outgoing unicast packets containing the multicast data via respective egress interfaces of the switch to the receiving nodes in the multicast group over the reliable connections,
wherein transmitting the multiple outgoing unicast packets comprises generating and transmitting the multiple outgoing unicast packets concurrently via the respective egress interfaces.

11. The method according to claim 10, and comprising receiving, from the receiving nodes over the reliable connections, acknowledgments of receipt of the outgoing unicast packets, and tracking the received acknowledgments in order to verify completion of distribution of the multicast data to the identified multicast group.

12. The method according to claim 11, and comprising retransmitting an outgoing unicast packet to a receiving node in the identified multicast group when a positive acknowledgment is not received from the receiving node within a predefined time limit.

13. The method according to claim 10, wherein transmitting the outgoing unicast packets comprises inserting the multicast metadata in the outgoing unicast packets.

14. The method according to claim 10, wherein the packet source is a host computer connected to the network.

15. The method according to claim 10, wherein the packet source is another switch in the network.

16. A method for communication, comprising:
storing, in a switch having a plurality of interfaces serving as ingress interfaces and egress interfaces for receiving and transmitting data packets from and to a network, context data with respect to multicast groups, each multicast group comprising a set of receiving nodes on the network;
establishing reliable connections over the network with the receiving nodes in the multicast groups;

receiving from a packet source on the network, via an ingress interface, an incoming unicast packet containing multicast data and containing multicast metadata that identifies a multicast group;

sending an acknowledgment of the received incoming unicast packet to the packet source; and transmitting, based on the stored context data with respect to the identified multicast group, multiple outgoing unicast packets containing the multicast data via respective egress interfaces of the switch to the receiving nodes in the multicast group over the reliable connections, wherein transmitting the outgoing unicast packets comprises inserting the multicast metadata in the outgoing unicast packets, and wherein at least one of the receiving nodes in at least one of the multicast groups is a further switch in the network, which receives one of the outgoing unicast packets and generates, in response to the multicast metadata in the one of the unicast packets, one or more further outgoing unicast packets containing the multicast data for transmission to one or more further receiving nodes.

17. The method according to claim 16, and comprising receiving, from the further switch, an acknowledgment of receipt of the one of the outgoing unicast packets, and tracking the received acknowledgment in order to verify completion of distribution of the multicast data to the identified multicast group.

18. A method for communication, comprising:

storing, in a switch having a plurality of interfaces serving as ingress interfaces and egress interfaces for receiving and transmitting data packets from and to a network, context data with respect to multicast groups, each multicast group comprising a set of receiving nodes on the network;

establishing reliable connections over the network with the receiving nodes in the multicast groups;

receiving from a packet source on the network, via an ingress interface, an incoming unicast packet containing multicast data and containing multicast metadata that identifies a multicast group;

sending an acknowledgment of the received incoming unicast packet to the packet source; and transmitting, based on the stored context data with respect to the identified multicast group, multiple outgoing unicast packets containing the multicast data via respective egress interfaces of the switch to the receiving nodes in the multicast group over the reliable connections, wherein receiving the incoming unicast packet comprises receiving from the packet source a multi-packet multicast message comprising an input sequence of incoming unicast packets including at least a first packet and a last packet, and wherein transmitting the multiple outgoing unicast packets comprises identifying the multicast group using the multicast metadata in the first packet in the input sequence, and transmitting multiple output sequences of the outgoing unicast packets via the respective egress interfaces to the receiving nodes, such that the first packet in the output sequences is transmitted before the last packet in the input sequence has been received through the ingress interface.

* * * * *